US009250360B2

(12) United States Patent
Leclaire et al.

(10) Patent No.: US 9,250,360 B2
(45) Date of Patent: Feb. 2, 2016

(54) METHOD FOR PRODUCING ZIRCONIA COLLOIDS

(71) Applicants: ESSILOR INTERNATIONAL (COMPAGNIE GENERALE D'OPTIQUE), Charenton le Pont (FR); SHANGHAI UNIVERSITY, Shanghai (CN)

(72) Inventors: Yves Leclaire, Charenton le Pont (FR); Jian Zhao, Singapore (SG); Liyi Shi, Shanghai (CN); Zhuyi Wang, Shanghai (CN); Shuai Yuan, Shanghai (CN); Yin Zhao, Shanghai (CN)

(73) Assignees: ESSILOR INTERNATIONAL (COMPAGNIE GENERALE D'OPTIQUE), Charenton le Pont (FR); SHANGHAI UNIVERSITY, Shanghai (CN)

( * ) Notice: Subject to any disclaimer, the term of this patent is extended or adjusted under 35 U.S.C. 154(b) by 78 days.

(21) Appl. No.: 14/151,434

(22) Filed: Jan. 9, 2014

(65) Prior Publication Data

US 2014/0125946 A1 May 8, 2014

Related U.S. Application Data

(63) Continuation-in-part of application No. PCT/CN2011/077062, filed on Jul. 12, 2011.

(51) Int. Cl.
*G02C 3/00* (2006.01)
*G02C 7/16* (2006.01)
(Continued)

(52) U.S. Cl.
CPC ............. *G02B 1/105* (2013.01); *B01J 13/0047* (2013.01); *B82Y 30/00* (2013.01); *C01G 25/02* (2013.01); *G02B 1/00* (2013.01); *G02B 1/113* (2013.01); *C01P 2002/72* (2013.01); *C01P 2004/16* (2013.01); *C01P 2004/64* (2013.01); *C01P 2006/22* (2013.01)

(58) Field of Classification Search
USPC ............... 106/286.4, 438, 450; 252/582, 588; 351/159.57; 501/104; 516/90; 524/413
See application file for complete search history.

(56) References Cited

U.S. PATENT DOCUMENTS 2,984,628 A 5/1961 Alexander et al.
4,784,794 A * 11/1988 Kato ...................... C01G 25/02
106/286.4

(Continued)

FOREIGN PATENT DOCUMENTS

CA 2 745 577 6/2010
CN 87 1 00809 10/1987

(Continued)

OTHER PUBLICATIONS

Yishi, H. et al.: "Preparation of nanometer ZrO2 by one step hydrothermal method", Inorganic Chemicals Industry, (2005), pp. 15-17 (English Abstract).

*Primary Examiner* — Bijan Ahvazi
(74) *Attorney, Agent, or Firm* — Norton Rose Fulbright US LLP

(57) ABSTRACT

The present invention pertains to a method for producing a colloidal suspension of zirconia particles, including successively subjecting a mixture of zirconium oxychloride and an alkali metal halide in an aqueous solvent to hydrothermal treatment at a temperature above 150° C, separating the slurry obtained from the supernatant, and peptizing said slurry by adding a strong acid thereto, and desalting said slurry, for example by ultrafiltration, so as to form a colloidal suspension of zirconia. The present invention also pertains to the transparent colloidal suspension obtainable by this method, and to an optical article, such as an ophthalmic lens, comprising a transparent polymer substrate and at least one coating prepared from a composition comprising said colloidal suspension.

20 Claims, 4 Drawing Sheets

(51) Int. Cl.
  *G02B 1/10* (2015.01)
  *B01J 13/00* (2006.01)
  *C01G 25/02* (2006.01)
  *G02B 1/00* (2006.01)
  *G02B 1/113* (2015.01)
  *B82Y 30/00* (2011.01)
  *F21V 9/00* (2015.01)
  *G02B 5/02* (2006.01)
  *G02C 7/10* (2006.01)
  *G02F 1/361* (2006.01)
  *G03B 11/00* (2006.01)
  *C08K 3/00* (2006.01)

(56) References Cited

U.S. PATENT DOCUMENTS 4,788,045 A    11/1988  Colombet et al.
7,157,406 B2   1/2007   Irgang et al.
2009/0088313 A1*  4/2009  Ohmori ............... B01J 13/0008
                                                      501/104
2010/0144918 A1*  6/2010  Chaput ............... B01J 13/0047
                                                      523/105
2011/0245397 A1*  10/2011 Nakagawa .......... B82Y 30/00
                                                      524/413

FOREIGN PATENT DOCUMENTS

| | | |
|---|---|---|
| CN | 101208268 | 6/2008 |
| CN | 101311121 | 11/2008 |
| CN | 101613123 | 12/2009 |
| JP | 2004198022 | 7/2004 |
| JP | 2005-170700 | 6/2005 |
| JP | 2005-179111 | 7/2005 |
| JP | 2008031023 | 2/2008 |
| JP | 2008201634 | 9/2008 |
| JP | 2009107872 | 5/2009 |

* cited by examiner

METHOD FOR PRODUCING ZIRCONIA COLLOIDS

CROSS-REFERENCE TO RELATED APPLICATIONS

This application is a continuation-in-part of International Patent Application No. PCT/CN2011/077062, filed Jul. 12, 2011, published as WO 2013/007015.

The foregoing application, and all documents cited therein or during its prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention pertains to a method for producing a colloidal suspension of zirconia particles. It also pertains to the colloidal suspension obtainable by this method, and to an optical article, such as an ophthalmic lens, comprising a transparent polymer substrate and at least one coating prepared from a composition comprising said colloidal suspension.

BACKGROUND OF THE INVENTION

It is well-known in the ocular glass field to use inorganic colloids in scratch-resistant and/or abrasion-resistant coatings (also referred to as "hard coatings") for improving the surface properties of organic glasses and/or for modifying the refractive index thereof. Such colloids are also used in anti-reflection coatings as well as in impact-resistant primers.

Zirconia, or zirconium dioxide, is one of these known colloids, because it provides a number of useful mechanical and physical properties, including high fracture toughness, mechanical strength and hardness, low thermal conductivity, high refractive index and transparency in the visible and infra-red spectral regions. However, it may be difficult to produce in a simple and reproducible manner a colloidal suspension of zirconia with high crystallinity in the form of a stable homogeneous dispersion of nanoparticles (having an average particle size of less than 20 nm) at high solids content (about 20 wt. %), and also to avoid their aggregation both during the preparation of the sot and during incorporation into a polymer matrix, for instance an epoxysilane matrix. Such a homogeneous dispersion is however required for the formation of a transparent zirconia-containing composite film and it directly affects the haze and transparency of the optical coating. This stable homogeneous dispersion may be expressed by the zeta potential of the suspension, which absolute value should be of at least 30 mV, and by its viscosity, which should be less than 10 cPs at 25° C. (no gelling should occur). The transparency is ensured by the low particle size with uniform and narrow size distribution. The high refractive index is related to the high crystallinity of the colloidal zirconia.

Several methods have already been proposed to prepare colloidal zirconia.

One known method for preparing acid zirconia colloids was to directly heat an aqueous solution of acid zirconium sources, such as zirconium oxychloride or zirconium nitrate, as disclosed in EP 0 229 657 and U.S. Pat. No. 2,984,928. Due to the strong acidic system, this kind of method results in zirconia colloids having a low crystallinity and in an incomplete reaction of the precursor, even through long heat treatment time of several days. This low crystallinity of the product would affect the refractive index of zirconia colloids, and directly affects their application in optical coatings.

Still another approach described in CN-101613123 and by HUANG Y. et al. in *Wujiyan Gongye*, 37(7), 15-17 (2005) has consisted in reacting a zirconium source, such as zirconium oxychloride, with an alkaline precipitant such as ammonia to obtain a zirconium hydroxide precipitate which is then subjected to hydrothermal treatment in the presence of a mineralizer, such as $NH_4Cl$, a hydroxide or a carbonate, for instance at a temperature of 125-350° C. After drying, a zirconia powder having a small and/or uniform particle size and a good dispersibility is said to be obtained. However, these methods lead to dry powders. When redispersed in a solvent, the particles will remain aggregated in some extent, which will be detrimental to the transparency of the colloidal suspensions obtained.

Similarly, US 2010/0144918 discloses a method for preparing colloidal zirconia suspensions, starting from a zirconium hydroxide suspension which may be prepared by adding a basic precipitant such as ammonia to zirconium oxychloride. Zirconium hydroxide is then reacted with an inorganic acid such as HCl before hydrothermally treating the suspension at 150-200° C. This method results in a zirconia sol having a dry matter content of 3-10% only, in which zirconia is provided as mainly tetragonal crystals.

It has now been found that the addition of a specific type of mineralizer to zirconium oxychloride, before subjecting it to a hydrothermal treatment performed within a specific reaction temperature range, allowed the formation of a colloidal suspension of monoclinic zirconia. at high dry content, having the properties required for an application in optical coatings, especially a high crystallinity, small particle size and a good dispersion.

SUMMARY OF THE INVENTION

An object of this invention is drawn to a method for producing a colloidal suspension of zirconia particles, comprising the following successive steps:
(a) subjecting a mixture of zirconium oxychloride and an alkali metal halide in an aqueous solvent to hydrothermal treatment at a temperature above 150° C.,
(b) separating the slurry obtained from the supernatant,
(c) peptizing said slurry by adding a strong acid thereto, and
(d) desalting said slurry, for example by ultrafiltration, so as to form a colloidal suspension of zirconia.

Another object of this invention pertains to a transparent colloidal suspension of zirconia obtainable by this method, wherein zirconia is provided in the form of single monoclinic rod-like crystallites, the dimensions of which range from 1 to 15 nm, and preferably from 1 to 4 nm, along their short axis and from 3 to 30 nm, and preferably from 5 to 15 nm, along their long axis.

Still another object of this invention is drawn to an optical article comprising a transparent polymer substrate and at least one coating prepared from a composition comprising a colloidal suspension as mentioned above.

DETAILED DESCRIPTION OF THE INVENTION

Figure 1:
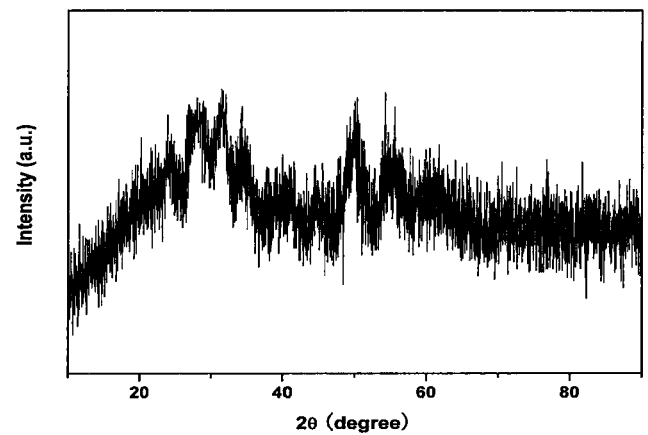
FIG. 1 illustrates the XRD pattern of zirconia colloid prepared using $ZrOCl_2$ as a zirconium source without any mineralizer.

As mentioned above, the present invention is mainly drawn to a method for producing a colloidal suspension of zirconia particles, comprising the following successive steps:
(a) subjecting a mixture of zirconium oxychloride and an alkali metal halide in an aqueous solvent to hydrothermal treatment at a temperature above 150° C.,
(b) separating the slurry obtained from the supernatant, and
(c) peptizing said slurry by adding a strong acid thereto, and
(d) desalting said slurry, for example by ultrafiltration, so as to form a colloidal suspension of zirconia.

In the first step of this method, zirconium oxychloride is used as a precursor of zirconium. As shown in the Examples below, experiments have shown that this precursor results in zirconia which is better dispersed than when using other sources of zirconium, such as zirconium nitrate. Zirconium oxychloride is blended with a mineralizer, namely an alkali metal halide. The choice of this mineralizer is also critical because experiments have shown that it enhances the crystallinity of the zirconia colloid, which directly affects the dispersion, transparency and stability of this colloid. The alkali metal halide may be selected from KF, KCl, KBr, KI, NaF, NaCl, NaBr, NaI, LiF, LiCl, LiBr, LiI and their mixtures. Potassium chloride is preferred in this invention.

The precursor and the mineralizer may be blended in any order, although it is preferred to add slowly an aqueous solution of the mineralizer into an aqueous solution of the precursor. Zirconium oxychloride is preferably mixed with the alkali metal halide AX in a molar ratio of $AX/ZrOCl_2$ from 1/10 to 1/1 and preferably from 1/4 to 1/2. Moreover, the zirconium oxychloride concentration in said mixture may range from 0.5 to 4 mol/l and preferably from 1 to 2 mol/l.

The mixture used in step (a) preferably does not contain any ammonium salt or ammonia. This mixture is then subjected to a hydrothermal treatment, which may be conducted in an autoclave during at least one day, at a temperature of 150 to 220° C., preferably from 160 to 200° C. and more preferably from 170 to 190° C. In this step, it is preferable not to add any other solvent to the mixture, such as an alcohol, because it has been shown that using mixed water/methanol or water/ethanol solvents resulted in a very had dispersion of zirconia, as evident from TEM images, which detrimentally affected the transparency of the suspension.

This hydrothermal treatment results in a two-phase system, namely a thick, white and viscous slurry containing most of the zirconia produced, and a transparent upper solution (or supernatant). This slurry is taken out in step (b) of the process, peptized in step (c) by adding thereto a strong acid such as nitric, sulphuric or hydrochloric acid, preferably hydrochloric acid, and desalted in step (d) by any appropriate means, such as by ultrafiltration.

The resulting suspension may then be purified by any appropriate means, such as by ultrafiltration. The process of this invention may include a further step of dialysis, so as to substitute at least one alcoholic solvent for the aqueous solvent. This can be advantageous in case the zirconia colloid is intended to be incorporated into a composition forming an optical coating after polymerization, because alcoholic solvents ensure effective redispersion in polymer matrixes forming these coatings.

The method of this invention may also include other intermediate or subsequent steps, in addition to those mentioned above. For instance, it can include a step of improving zirconia dispersion, either by adding a dispersant, or by surface modification of the zirconia, both of which may be performed either after the purification step or even after the dialysis step described above. Another intermediate or subsequent step can also be a step of pH modification, for example by addition of an inorganic or organic base, which can be possibly followed by a desalting step to obtain the stable zirconia colloid in a basic pH.

The above method results in a transparent colloidal suspension of highly crystalline zirconia, in which zirconia is provided in the form of single monoclinic rod-like crystallites, the dimensions of which range from 1 to 15 nm, and preferably from 1 to 4 nm, along their short axis and from 3 to 30 nm, and preferably from 5 to 15 nm, along their long axis.

It is well understood that the dimensions along the "short axis" will be comprised within the above ranges but in any case smaller than those measured along the "long axis", which will also be comprised within the above ranges. Moreover, the dimensions of the crystallites may be tuned by selecting specific alkali metal halides; for instance, preliminary experiments have shown that larger particles may be obtained using fluorides instead of chlorides.

This suspension may also be characterized by its zeta potential, which absolute value is generally of at least 30 mV and/or by the refractive index of the zirconia particles, which is usually of at least 1.8, preferably of at least 1.9, with a solid content of at least 15 wt. %, preferably of at least 20 wt. %. Its pH may be between 2 and 11 and is preferably between 3 and 5. Furthermore, its viscosity is preferably below 10 cPs, as measured at 25° C. with a Brookfield Viscosimeter DV-C with UL adapter.

Moreover, this suspension, when it is acidic (pH<6), is usually free of stabilizer. When basic, it may include a stabilizer which may be chosen from α-hydroxyacids such as gluconic acid, citric acid and/or tartaric acid.

This zirconia colloid may then be used in the manufacture of an optical coating, such as an abrasion- or scratch-resistant coating or an anti-reflective coating. For this purpose, it may be introduced into a coating composition which includes an epoxysilane (such as GLYMO) and optionally also other colloidal particles than zirconia and/or a curing catalyst (such as an aluminium chelate) at least one alkoxysilane which does not contain any reactive functional group but optionally contains at least one non-hydrolyzable organic group. After or before introducing therein the zirconia colloid, this composition may be hydrolyzed, and it may then be cured, according to well-known sol/gel processes. Alternatively, the zirconia colloid of this invention may be introduced into an adhesion or impact-resistant primer composition, comprising a thermoplastic matrix including polyurethane or a homo- or copolymer of (meth)acrylic acid ester.

The above coating composition may be applied, for instance by dip coating or spin coating, onto a transparent polymer substrate, which may be a thermoplastic resin such as thermoplastic polycarbonate derived from bisphenol A, polyurethane and homo- and copolymers of (meth)acrylate, or a thermoset or photo-cured resin, which may be obtained by polymerization of allyl carbonates of linear or branched aliphatic or aromatic polyols such as diethylene glycol bis (allyl carbonate) (CR 39®).

It is thus possible to obtain an optical article, such as an ophthalmic lens, comprising a transparent polymer substrate and at least one coating prepared from a composition comprising colloidal suspension as described above.

EXAMPLES

This invention will be further illustrated by the following non-limiting examples which are given for illustrative purposes only and should not restrict the scope of the appended claims.

Example 1

Preparation of Colloidal Zirconia

A solution was prepared by dissolving 13.0 g of KCl in 80 ml of water under magnetic stirring. This solution was added into a solution prepared by dissolving 225.6 g of $ZrOCl_2 \cdot 8H_2O$ in 250 ml of deionized water under magnetic stirring. Stirring was continued and the solution was then completed to 500 ml with water.

375 ml of the precursor mixture were filled into a 500 ml lined Teflon® autoclave. The autoclave was placed in an oven and submitted to a temperature of 180° C. during 72 h. The supernatant was then removed to keep only the white slurry containing the zirconia particles.

2.4 l of HCl (0.1 M) were added slowly to the slurry under stirring. The suspension was then purified by ultrafiltration until a pH of 3.8 was reached. The dry content was adjusted between 16% and 16.5% and 380 mL of colloidal suspension was thus obtained.

The colloid suspension was then dialysed in contact with pure methanol until the water content was less than 0.1%. 330 ml of colloidal suspension in methanol was thus obtained, with a dry content of 21.5±1%. The yield of conversion of the zirconium precursor into zirconia particles was close to 90%.

Example 2

Characterization of the Colloidal Zirconia

A series of experiments were performed on the colloidal suspension obtained in Example 1.

TEM observation (JEM-200CX® electron microscope from JEOL) allowed checking particle size, shape and aggregation state. Moreover, a powder XRD pattern of the sample was performed on a D/Max-2200 X-ray diffraction meter (RIGAKU CORPORATION) at room temperature, operating at 30 kV and 30 mA, using Cy kα radiation ($\lambda$=0.15418 nm). According to the TEM and XRD observations, the colloidal zirconia had a high crystallinity and it was present as single rod-like monoclinic nanocrystallites with short axis range from 2 to 5 nm and long axis range from 3 to 14 nm. TEM observations confirmed also that the particles were well dispersed and not aggregated, as was also indicated by the transparency of the colloidal suspension.

The zeta potential, as measured with a Zetasizer Nano ZS90® (MALVERN INSTRUMENTS Ltd.), was 34.5 mV, indicating the high stability of the suspension. Moreover, the particle size distribution obtained by Zetasizer was narrow, indicating a uniform size distribution.

Further, elemental analysis was performed by inductively-coupled plasma-atomic emission spectroscopy (ICP-AES, Optima 7300DV) and X-ray fluorescence to assess the bulk chemical composition of the product. They showed the high purity of the zirconia colloid produced.

Moreover, X-ray photoelectron spectroscopy (XPS) was conducted to investigate the surface chemical composition and valence state of the zirconia colloid sample. Spectra were recorded by a PHI-5000C ESCA spectrometer using Mg Kα radiation (hv=1253.6 eV). The C 1s line was taken as a reference to calibrate the shift of binding energy due to electrostatic charging. From this experiment, one could confirm that the oxidation state of Zr was +4 and that there was only one chemical state of oxygen in zirconia.

Finally, after drying the zirconia sample into a powder at room temperature, FTIR spectra were measured on an AVATAR® 370-IR spectrometer (THERMO NICOLET) with a wavenumber range of 4000 to 400 $cm^{-1}$. Absorption bands located at 3396 $cm^{-1}$, 1629 $cm^{-1}$ and 500-1000 $cm^{-1}$ were respectively attributed to the O—H (and molecularly adsorbed water), H—O—H and Zr—O stretching or bending vibrations. These results also confirmed that no organic group was detected in the dried powder, showing that the particles surface was not functionalized with organic groups.

These experiments confirm that pure zirconia colloids with high dispersion, transparency, stability, refractive index and solid content could be prepared by the method if this invention.

Example 3

Influence of the Mineralizer

Zirconia colloids were prepared as described in Example 1, except that various mineralizers were used instead of KCl, as well as no mineralizer at all.

Figure 2:
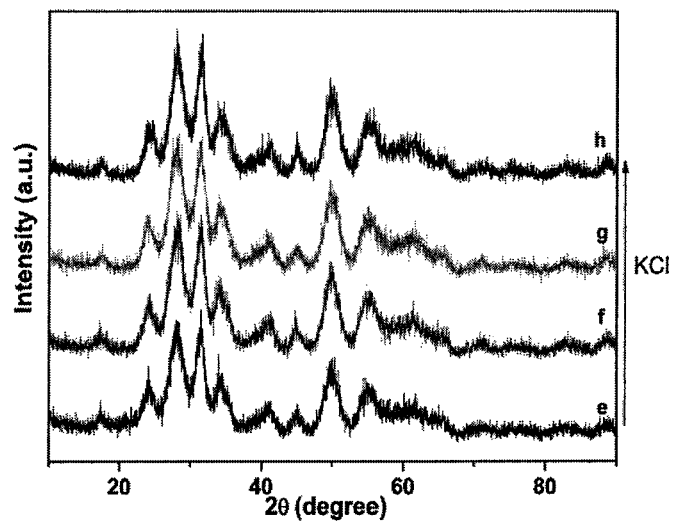
FIG. 2 illustrates the XRD patterns of zirconia colloids prepared using $ZrOCl_2$ as a zirconium source and NaOH as mineralizer (a: $ZrOCl_2$:NaOH=1:0.1; b: $ZrOCl_2$:NaOH=1:0.15; c: $ZrOCl_2$:NaOH=1:0.2; d: $ZrOCl_2$:NaOH=1:0.25.

The colloid obtained without any mineralizer resulted in the XRD pattern shown in FIG. 1. Using KCl as a mineralizer resulted in the XRD patterns shown on FIG. 2. Diffraction peaks without mineralizer are very weak, characteristic of nearly amorphous particles. On the contrary, the peaks are intense and sharper when KCl is used as mineralizer, showing that the high crystallinity can only be obtained by the use of a suitable mineralizer, like KCl.

Figure 3:
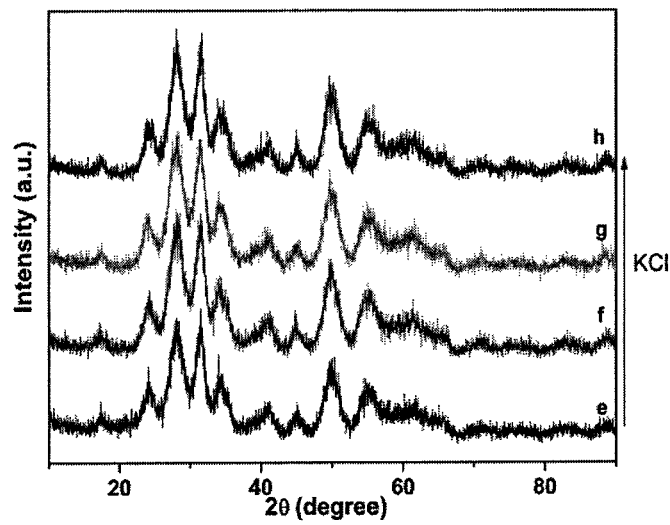
FIG. 3 illustrates the XRD patterns of zirconia colloids prepared using $ZrOCl_2$ as a zirconium source and KCl as mineralizer (e: $ZrOCl_2$:KCl=1:0.0625; f: $ZrOCl_2$:KCl=1:0.25; g: $ZrOCl_2$:KCl=1:0.5; h: $ZrOCl_2$:KCl=1:0.75).

NaOH was then used as a mineralizer in different molar ratios of $ZrOCl_2$:NaOH. The XRD patterns of the colloids obtained are shown on FIG. 2. Using KCl as a mineralizer resulted in the XRD patterns shown on FIG. 3. A comparison of these figures shows that, whatever the molar ratio tested, the diffraction peaks are stronger, and thus the crystallinity of the zirconia colloid is always higher, when KCl is used as a mineralizer.

Various other alkali metal halides were then investigated. The XRD patterns obtained are shown on FIG. 4. As illustrated, all samples prepared by using different alkali metal halides as mineralizers exhibited much higher crystallinity when compared with the samples prepared by using NaOH as a mineralizer (see FIG. 2).

Figure 4A:
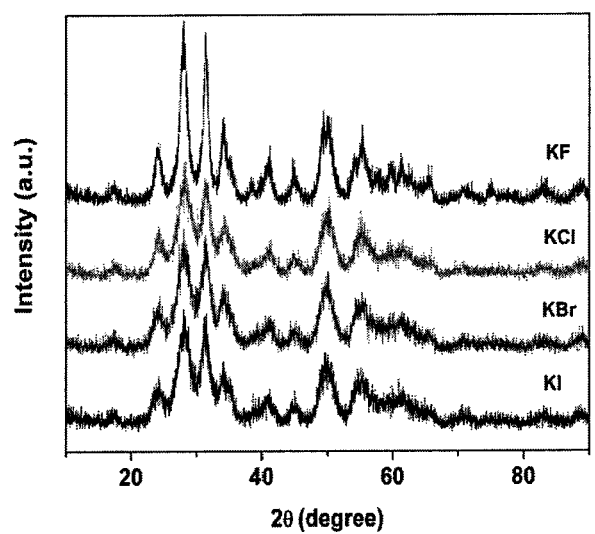
FIG. 4A-C illustrates the XRD patterns of zirconia colloids prepared using different alkali metal halides.
Figure 4B:
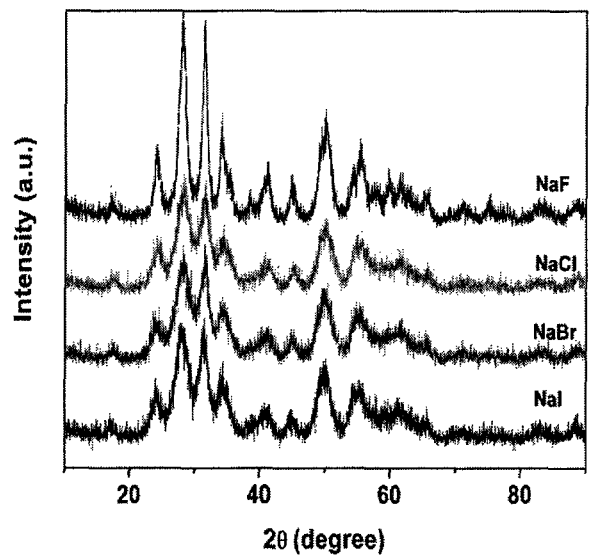
Figure 4C:
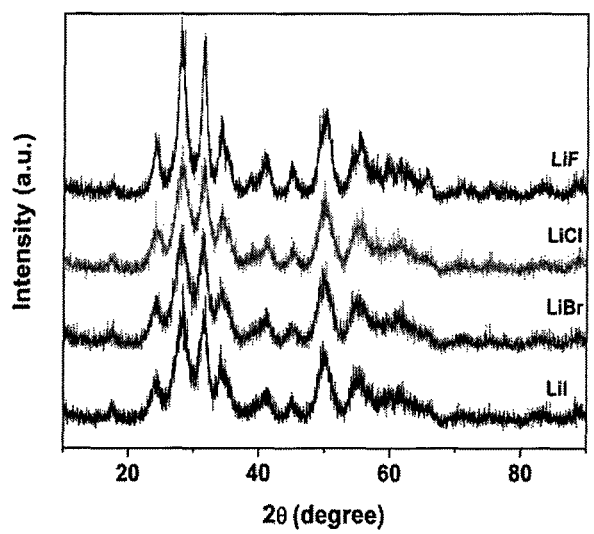

Among those alkali metal halides, the diffraction patterns obtained by use of alkali metal fluoride exhibit sharper and more intense peaks than the others (see FIG. 4). This shows that alkali metal fluorides lead to larger particle size than when other alkali metal halides are used as mineralizers. This fact was confirmed also by particle size measurements from TEM images. The crystallites obtained from KCl had average dimensions of 3.5 nm width for 8 mm length, whereas those prepared from KF had 8 mm width for 13 mm length.

This example demonstrates that the type of mineralizer significantly affects the crystallinity and the particle size of the zirconia colloid obtained, which directly affects the refractive index and the transparency of this product, and its achievable maximum solid content. Alkali metal halides provide for a significantly enhanced crystallinity compared with NaOH, which is thought to be due to their ability to modify the viscosity and the solubility properties in the reactive solution during the hydrothermal treatment. This example demonstrates also that the choice of the alkali metal halide mineralizer can allow tuning the final particle size.

Example 4

Influence of the Reaction Temperature

Two zirconia colloids were prepared as described in Example 1, except that the reaction temperature was lowered to 120 and 150° C., respectively.

Figure 5:
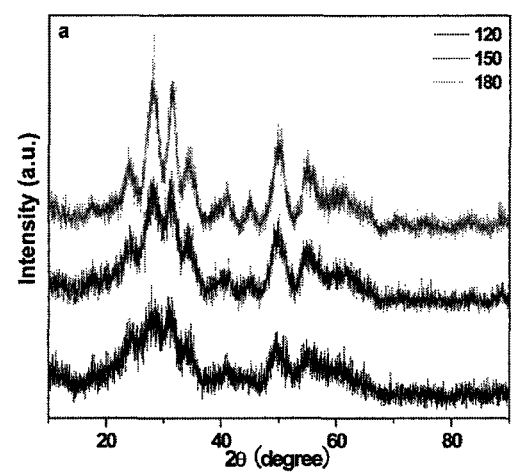
FIG. 5 illustrates the XRD patterns of zirconia colloids prepared at different temperatures.

As evident from FIG. 5, which illustrates the XRD spectra of these samples and of that of Example 1, the crystallinity of zirconia was better at 180° C., which was reflected by sharper peaks. Moreover, TEM images of these samples showed the samples prepared at 120° C. and 150° C. had more agglomerated particles. The colloidal suspension obtained by thermal treatment at 180° C. exhibited also higher transparency than those prepared at 120° C. and 150° C. This shows that the colloids prepared at 120° C. and 150° C. were poorly dispersed, compared with that prepared at 180° C. This result was confirmed using a higher molar ratio of KCl to $ZrClO_2$ (0.5:1).

This example shows that the reaction temperature has an obvious effect on the crystallinity and dispersion of the zirconia colloid, and that temperatures above 150° C. give better results in this respect.

Example 5

Influence of the Zirconium Source

A zirconia colloid was prepared as described in Example 1, except that zirconium nitrate was substituted for zirconium oxychloride as the zirconium source.

It was observed that, compared with the sample using $ZrOCl_2$ as the zirconium source, the sample prepared using $Zr(NO_3)_4$ possess a higher crystallinity but lower dispersion and transparency, which are however crucial from the standpoint of the stability of the zirconia colloid formed and of the maximum solid content which may be achieved.

This example shows that the zirconium source affects the dispersion of the zirconia colloid obtained and that $ZrOCl_2$ is a better zirconium source, in this regard, than $Zr(NO_3)_4$.

The invention will be further described by the following numbered paragraphs:

1. A method for producing a colloidal suspension of zirconia particles, comprising the following successive steps:
   a) subjecting a mixture of zirconium oxychloride and an alkali metal halide AX in an aqueous solvent to hydrothermal treatment at a temperature above 150° C.,
   b) separating the slurry obtained from the supernatant, and
   c) peptizing said slurry by adding a strong acid thereto, and
   d) desalting said slurry, for example by ultrafiltration, so as to form a colloidal suspension of zirconia.

2. The method according to paragraph 1, wherein the alkali metal halide is potassium chloride.

3. The method according to paragraph 1, wherein zirconium oxychloride and the alkali metal halide are mixed in a molar ratio of $AX/ZrOCl_2$ from 1/10 to 1/1 and preferably from 1/4 to 1/2.

4. The method according to paragraph 1, wherein zirconium oxychloride concentration in said mixture ranges from 0.5 to 4 mol/l and preferably from 1 to 2 mol/l.

5. The method according to paragraph 1, wherein the hydrothermal treatment is conducted at a temperature from 150 to 220° C., preferably from 160 to 200° C. and more preferably from 170 to 190° C., during at least one day.

6. The method according to paragraph 1, wherein peptization is conducted by means of hydrochloric acid.

7. The method according to paragraph 1, wherein the method further includes a step of pH modification by addition of an inorganic or organic base.

8. The method according to any paragraph 1, wherein the method further includes a step of improving zirconia dispersion, either by adding a dispersant, or by surface modification of the zirconia.

9. The method according to paragraph 1, wherein it further includes a step of dialysis so as to substitute at least one alcoholic solvent for the aqueous solvent.

10. A transparent colloidal suspension of zirconia obtainable by the method according to any of paragraphs 1 to 9, wherein zirconia is provided in the form of single monoclinic rod-like crystallites, the dimensions of which range from 1 to 15 nm, and preferably from 1 to 4 nm, along their short axis and from 3 to 30 nm, and preferably from 5 to 15 nm, along their long axis.

11. The transparent colloidal suspension according to paragraph 10, wherein it has a zeta potential of at least 30 mV in absolute value.

12. The transparent colloidal suspension according to paragraph 10, wherein it has a solid content of at least 15 wt. %, preferably of at least 20 wt. %.

13. The transparent colloidal suspension according to paragraph 10, wherein the zirconia particles have a refractive index of at least 1.8, preferably of at least 1.9.

14. The transparent colloidal suspension according to paragraph 10, wherein the pH is under 6 and that it is free of stabilizer.

15. An optical article, such as an ophthalmic lens, comprising a transparent polymer substrate and at least one coating prepared from a composition comprising a colloidal suspension according to paragraph 10.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A method for producing a colloidal suspension of zirconia particles, comprising the following successive steps:
   a) subjecting a mixture of zirconium oxychloride ($ZrOCl_2$) and an alkali metal halide in an aqueous solvent to hydrothermal treatment at a temperature above 150° C., b) separating a slurry obtained from a supernatant in step (a), and c) peptizing said slurry by adding a strong acid thereto, and d) desalting said slurry, so as to form the colloidal suspension of zirconia particles.

2. The method according to claim 1, wherein the alkali metal halide is potassium chloride.

3. The method according to claim 1, wherein the zirconium oxychloride and the alkali metal halide are mixed in a molar ratio of the alkali metal halide/$ZrOCl_2$ from 1/10 to 1/1.

4. The method according to claim 3, wherein the molar ratio of alkali metal halide/$ZrOCl_2$ is from 1/4 to 1/2.

5. The method according to claim 1, wherein the zirconium oxychloride concentration in said mixture ranges from 0.5 to 4 mol/l.

6. The method according to claim 5, wherein the zirconium oxychloride concentration in said mixture ranges from 1 to 2 mol/l.

7. The method according to claim 1, wherein the hydrothermal treatment is conducted at a temperature from 150 to 220° C. during at least one day.

8. The method according to claim 7, wherein the hydrothermal treatment is conducted at a temperature from 160 to 200° C. during at least one day.

9. The method according to claim 8, wherein the hydrothermal treatment is conducted at a temperature from 170 to 190° C. during at least one day.

10. The method according to claim 1, wherein peptizing is conducted by means of hydrochloric acid.

11. The method according to claim 1, wherein the method further includes a step of pH modification by addition of an inorganic or organic base.

12. The method according to claim 1, wherein the method further includes a step of improving zirconia dispersion, either by adding a dispersant, or by surface modification of the zirconia particles.

13. The method according to claim 1, wherein it further includes a step of dialysis so as to substitute at least one alcoholic solvent for the aqueous solvent.

14. A transparent colloidal suspension of zirconia particles obtainable by the method according to claim 1, wherein the zirconia particles are provided in the form of single monoclinic rod-like crystallites, the dimensions of which range from 1 to 15 nm along their short axis and from 3 to 30 nm along their long axis.

15. The transparent colloidal suspension according to claim 14, wherein the transparent colloidal suspension has a zeta potential of at least 30 mV in absolute value.

16. The transparent colloidal suspension according to claim 14, wherein the transparent colloidal suspension has a solid content of at least 15 wt. %.

17. The transparent colloidal suspension according to claim 16, wherein the transparent colloidal suspension has a solid content of at least 20 wt. %.

18. The transparent colloidal suspension according to claim 14, wherein the zirconia particles have a refractive index of at least 1.8.

19. The transparent colloidal suspension according to claim 14, wherein a pH is under 6 and the transparent colloidal suspension is free of stabilizer.

20. An optical article comprising a transparent polymer substrate and at least one coating prepared from a composition comprising a colloidal suspension according to claim 14.

* * * * *